United States Patent [19]

LeBlanc et al.

[11] Patent Number: 5,417,731
[45] Date of Patent: May 23, 1995

[54] METHOD OF HEATING A CHARGE, INCLUDING INJECTING SECONDARY OXIDANT INTO THE OUTPUT PORT

[75] Inventors: John R. LeBlanc, Perrysburg; Thomas K. Dankert, Sylvania, both of Ohio; Geoffrey B. Tuson, Yorktown Heights, N.Y.

[73] Assignees: Owens-Brockway Glass Container, Inc.; Praxair Technology, Inc., both of Danbury, Conn.

[21] Appl. No.: 120,501

[22] Filed: Sep. 14, 1993

[51] Int. Cl.⁶ ............................................. C03B 5/04
[52] U.S. Cl. .................... 65/134.4; 432/161; 65/134.6
[58] Field of Search ............... 431/10, 174, 178; 432/161, 30, 180, 54; 65/135, 134.6, 134.4, 27

[56] References Cited

U.S. PATENT DOCUMENTS

| | | | |
|---|---|---|---|
| 4,060,378 | 11/1977 | Perédi | 431/10 |
| 4,347,072 | 8/1982 | Nagaoka | 65/135 |
| 4,599,100 | 7/1986 | Demarest, Jr. | 65/134 |
| 4,969,942 | 11/1990 | Schwenninger | 65/27 |
| 4,973,346 | 11/1990 | Kobayashi | 65/135 |
| 5,076,779 | 12/1991 | Kobayashi | 431/5 |
| 5,139,414 | 8/1992 | Nakamoto | 431/10 |
| 5,147,438 | 9/1992 | Castelain et al. | 65/135 |
| 5,176,086 | 1/1993 | Clark et al. | 110/346 |
| 5,186,617 | 2/1993 | Ho | 431/9 |
| 5,203,859 | 4/1993 | Khinkis et al. | 432/30 |

OTHER PUBLICATIONS

Sieger, W. et al., Korting Hanover AG, Reducing $NO_x$ Emission At Glass Melting Furnaces, pp. 99–101.

*Primary Examiner*—W. Gary Jones
*Assistant Examiner*—John Hoffmann
*Attorney, Agent, or Firm*—Stanley Ktorides

[57] ABSTRACT

A combustion method wherein oxidant and fuel are provided into a charged furnace in a substantially stoichiometric ratio for relatively complete combustion and secondary oxidant is provided in a defined manner outside the furnace for further combustion without excessive $NO_x$ or carbon monoxide formation.

5 Claims, 1 Drawing Sheet

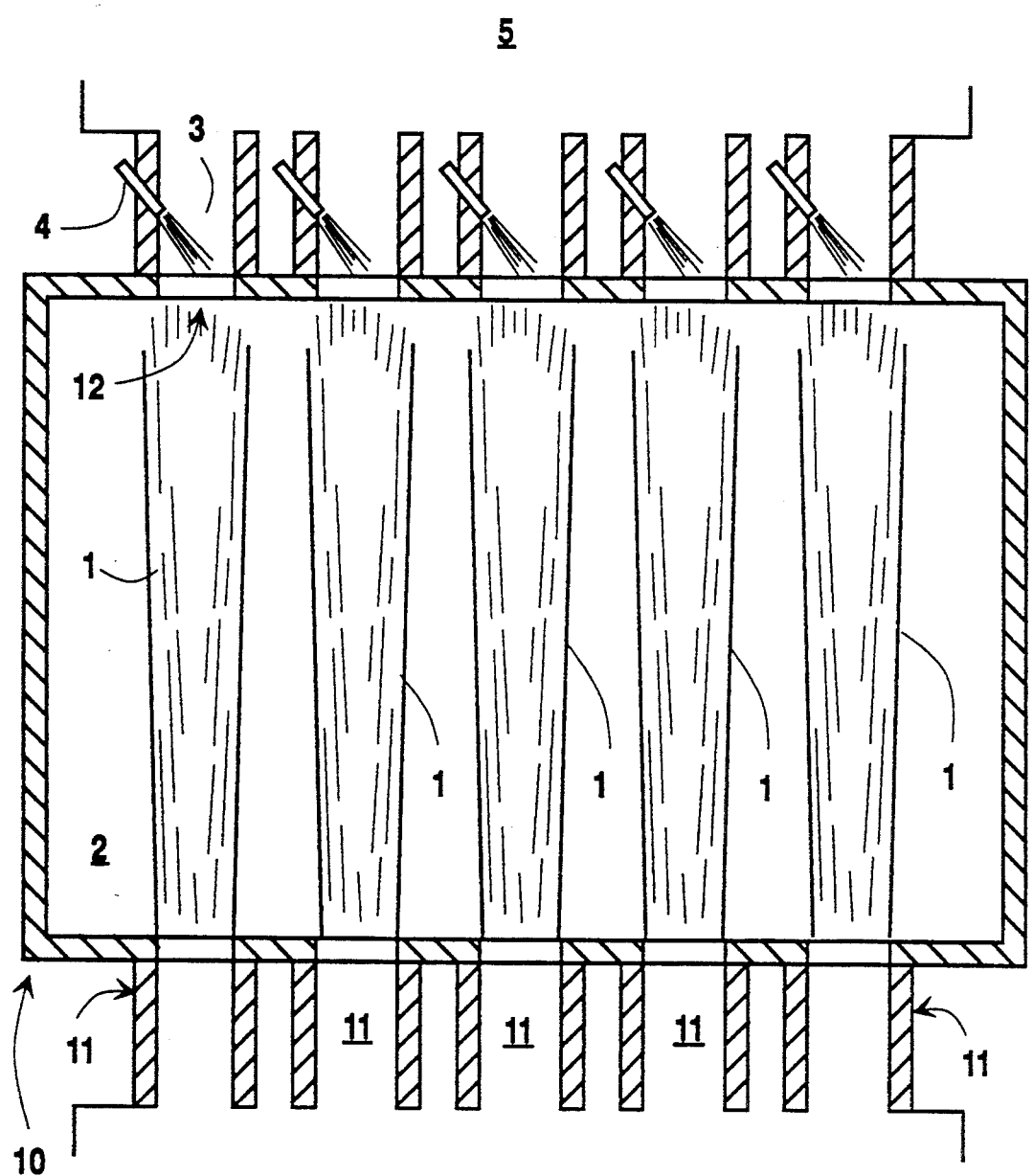

METHOD OF HEATING A CHARGE, INCLUDING INJECTING SECONDARY OXIDANT INTO THE OUTPUT PORT

TECHNICAL FIELD

The invention relates generally to furnace combustion wherein heat is produced to heat a charge.

BACKGROUND ART

Many industrial processes employ furnaces wherein fuel and oxidant are combusted to generate heat which is used to heat a charge within the furnace. Among such industrial processes one can name glassmaking wherein the charge is glassmaking materials or molten or solid glass, steelmaking wherein the charge is steel or iron and aluminum melting wherein the charge is aluminum ingots or scrap.

In carrying out such furnace combustion it is desirable to completely combust the fuel within the furnace as this serves to maximize the amount of heat released within the furnace and available to heat the charge. Accordingly, oxidant and fuel may be provided into the furnace in a ratio which is not substoichiometric since a substoichiometric ratio would cause some of the fuel to remain unburned or would result in the generation of significant amounts of products of incomplete combustion such as carbon monoxide, hydrocarbons and carbon.

At first glance it would appear that the optimum ratio for providing oxidant and fuel into a furnace for combustion is one that is substantially stoichiometric. However, in practice, such firing leads to some incomplete combustion because of less than perfect mixing of fuel and oxidant within the furnace and also because the reaction kinetics of the fuel and oxidant may not enable all of the fuel to completely combust prior to exiting the furnace. Accordingly, in actual industrial practice, furnaces of this type are operated with excess oxygen to ensure the complete combustion of the fuel within the furnace. Unfortunately, when furnaces are operated in this way, i.e., where oxidant and fuel are provided into the furnace in a superstoichiometric ratio, there arises the tendency to generate excessive levels of nitrogen oxides ($NO_x$) because oxygen in excess of that needed to react with the fuel becomes available to combine with nitrogen to form $NO_x$. $NO_x$ is a significant pollutant and there exists a need to reduce the amount of $NO_x$ generated when carrying out combustion.

Accordingly, it is an object of this invention to provide a method for carrying out essentially complete combustion to generate heat efficiently within a furnace to heat a charge while avoiding the generation of high Levels of $NO_x$.

SUMMARY OF THE INVENTION

The above and other objects which will become apparent to one skilled in the art upon a reading of this disclosure are attained by the present invention which is:

A method for carrying out combustion comprising:
(A) providing fuel and oxidant in a substantially stoichiometric ratio into a furnace which is in flow communication with a flue system and which contains a charge;
(B) combusting said fuel and oxidant within the furnace to produce combustion reaction gases including carbon monoxide, and to generate heat for heating the charge;
(C) passing combustion reaction Bases from the furnace into the flue system;
(D) injecting secondary oxidant at a velocity of at least 20 feet per second into the flue system at a location where the temperature of the combustion reaction gases is at least 1600° F.; and
(E) reacting secondary oxidant with carbon monoxide contained in the combustion reaction gases within the flue system to produce carbon dioxide.

As used herein, the term "substantially stoichiometric" means not less than 99 percent or more than 105 percent of stoichiometric.

As used herein, the term "flue system" means a passage communicating with a furnace by a conduit having a narrower cross-sectional flow area than does the furnace, said passage capable of passing furnace gases from the furnace to the ambient atmosphere.

As used herein the term "ambient atmosphere" means the outside atmosphere or an inside atmosphere which can pass or leak into the outside atmosphere.

As used herein, the term "charge" means material within a furnace which is intended to be heated and in some cases melted.

BRIEF DESCRIPTION OF THE DRAWING

The sole FIGURE is a simplified plan view representation of one embodiment of the invention as it may be practiced in conjunction with a cross-fired furnace.

DETAILED DESCRIPTION

The invention will be described in detail with reference to the drawing.

Referring now to the FIGURE there is illustrated a plan view of cross-fired glassmelting furnace 10. The practice of this invention will have particular utility in regenerative glassmelting furnaces where physical obstructions make introducing secondary oxidant into the combustion chamber difficult. Other types of furnaces wherein the invention may be advantageously practiced include steel reheating furnaces and aluminum melting furnaces. Furnace 10 contains a charge 2 of glassmaking materials and molten glass which pass through the furnace underneath the cross-fired flames.

Fuel and furnace oxidant are provided into the furnace in a substantially stoichiometric ratio through one or more burners or ports 11. In the embodiment illustrated in the FIGURE, five such burners are shown. The fuel may be any fluid fuel such as methane, propane, natural gas or fuel oil. The oxidant may be air or a fluid having an oxygen concentration greater than that of air.

Within furnace 10 the fuel and oxidant combust such as is illustrated by flames 1 in the FIGURE. The combustion generates heat which is employed within the furnace to heat, and in some cases to melt, the charge. In carrying out the combustion there are produced combustion reaction gases. The temperature of the combustion reaction gases produced in the furnace is generally within the range of from 2200° to 3100° F. Because of the substantially stoichiometric ratio at which the fuel and oxidant are provided into the furnace, most of the combustion reaction gases produced are products of complete combustion, i.e., carbon dioxide and water vapor. However, there are also produced some products of incomplete combustion including carbon monoxide and perhaps hydrocarbons and carbon in the combustion reaction gases.

The combustion reaction gases are passed from the furnace into the flue system. In the embodiment illustrated in the FIGURE the flue system comprises chimney system 5, which can pass the gases into the ambient atmosphere, and exhaust port 3 which communicates with the furnace. The cross-sectional flow area 12 where the flue system communicates with the furnace is smaller than the cross-sectional flow area of the furnace through which the combusting fuel and oxidant travel. The embodiment illustrated in the FIGURE illustrates five exhaust ports each corresponding to a burner. It will be recognized by one skilled in the art that the invention may be practiced with any practical number of burners and exhaust ports including one burner and/or one exhaust port.

Secondary oxidant is injected into the flue system, preferably, as illustrated in the FIGURE, into the exhaust port or ports. The secondary oxidant is injected into the flue system through lance 4. As mentioned, the FIGURE is a simplified representation intended to illustrate the method of this invention. Accordingly, there is not shown the sources of fuel and oxidant. Those skilled in the art will readily recognize the fuel and oxidant are provided to the burners and lances from appropriate sources through conduits which are not shown. The secondary oxidant may be air or a fluid having an oxygen concentration greater than that of air. Preferably the secondary oxidant has an oxygen concentration of at least 80 mole percent and most preferably greater than 90 mole percent.

A high oxygen concentration in the secondary oxidant is preferred because this enables a smaller volume of secondary oxidant to oxidize a given quantity of products of incomplete combustion. Therefore the pressure of the secondary oxidant and/or the size of conduits and lances for secondary oxidant can be reduced. The volume of gas to be passed through the flue system is also reduced, which can be advantageous if the flue system area is restricted due to factors such as clogging by particulates, as often happens in glassmelting facilities. High secondary oxidant oxygen concentration is also preferable if a system is in place to capture useful heat from the furnace exhaust gases, as in the case of regenerative glass melting furnaces. Since less diluent, which is mostly nitrogen, is present in the secondary oxidant, furnace fuel efficiency is impacted less by heat being absorbed and carried away by the diluent gases.

The concentration of products of incomplete combustion within the combustion reaction gases passing through the flue system is relatively low because the oxidant and fuel are provided into the furnace in a substantially stoichiometric ratio and not at a significantly substoichiometric ratio. In order for the secondary oxidant to effectively burn out the products of incomplete combustion, some residence time at a high temperature is required. This is achieved by injecting the secondary oxidant into the flue system at a location where the combustion reaction gases are at a temperature of at least 1600° F. Below 1600° F. the reaction kinetics of the oxidation of carbon monoxide proceed too slowly for the effective utilization of the method of this invention. Preferably the temperature of the combustion reaction gases at the secondary oxidant injection location will be at least 2000° F.

The secondary oxidant injection must create sufficient turbulence or flow disruption to mix with and combust the relatively dilute products of incomplete combustion which may include hydrocarbons in addition to carbon monoxide. Such desired flow effects are attained by injecting the secondary oxidant into the flue system at a velocity of at least 20 feet per second and preferably within the range of from 50 to 300 feet per second. In addition, as illustrated in the FIGURE it is preferred that the secondary oxidant is injected into the flue system in a direction toward the furnace, i.e., in a direction counter to the flow direction of the combustion reaction gases passing through the flue system.

Within the flue system the secondary oxidant reacts with carbon monoxide in the combustion reaction gases to produce carbon dioxide. If hydrocarbons are also present within the combustion reaction gases, the secondary oxidant will react with such hydrocarbons to produce carbon dioxide and water vapor. The injection of secondary oxidant into the exhaust port of the flue system is particularly preferred because the combustion reaction gases are at their highest temperature at this location. As discussed previously, high temperature promotes rapid reaction between the combustion reaction gases and the secondary oxidant. Furthermore, the confined volume of the exhaust port contributes to the ability of the secondary oxidant to react with the dilute carbon monoxide and maximizes the burnout of the products of incomplete combustion.

The method of this invention is advantageous over conventional combustion methods which seek to reduce the level of products of incomplete combustion which reach the ambiant atmosphere from a furnace by providing oxidant and fuel into the furnace in an oxygen-rich or excess air mode because such oxygen-rich operation is vulnerable to excessive $NO_x$ generation. Moreover, conventional combustion staging systems which supply secondary oxygen directly into the furnace have the disadvantage, in the case of some furnace geometries, of the difficulty of providing the additional oxygen in a manner which enables effective combustion of a significant amount of the products of incomplete combustion within the furnace.

Although the invention has been described in detail with reference to a certain preferred embodiment, those skilled in the art will recognize that there are other embodiments of the invention within the spirit and scope of the claims.

We claim:

1. A method for carrying out combustion comprising:
   (A) providing fuel and oxidant in a substantially stoichiometric ratio into a furnace which contains a charge and which communicates with a flue system through an exhaust port of the flue system, said exhaust port having a smaller cross-sectional area than the cross-sectional area of the furnace;
   (B) combusting said fuel and oxidant within the furnace to produce combustion reaction gases including carbon monoxide, and to generate heat for heating the charge;
   (C) passing the combustion reaction gases from the furnace into and through the exhaust port of the flue system;
   (D) injecting secondary oxidant into the exhaust port at a velocity of at least 20 feet per second at a location where the temperature of the combustion reaction gases is at least 1600° F; and
   (E) reacting the secondary oxidant with the carbon monoxide contained in the combustion reaction gases within the exhaust port of the flue system to produce carbon dioxide.

2. The method of claim 1 wherein the charge comprises glass or glassmaking materials.

3. The method of claim 1 wherein the secondary oxidant is injected into the exhaust port of the flue system in a direction toward the furnace counter to the flow direction of the combustion reaction gases passing through the exhaust port of the flue system.

4. The method of claim 1 wherein the secondary oxidant has an oxygen concentration of at least 80 mole percent.

5. The method of claim 1 wherein the temperature of the combustion reaction gases at the secondary oxidant injection location is at least 2000° F.

* * * * *

UNITED STATES PATENT AND TRADEMARK OFFICE
CERTIFICATE OF CORRECTION

PATENT NO. : 5,417,731
DATED     : May 23, 1995
INVENTOR(S) : J.R. LeBlanc etal

It is certified that error appears in the above-identified patent and that said Letters Patent is hereby corrected as shown below:

In column 1, line 55 delete "Levels" and insert therefor --levels--.

In column 2, line 3 delete "Bases" and insert therefor --gases--.

Signed and Sealed this

Eighth Day of August, 1995

Attest:

BRUCE LEHMAN

Attesting Officer

Commissioner of Patents and Trademarks